(12) United States Patent
Atighetchi et al.

(10) Patent No.: US 11,651,079 B2
(45) Date of Patent: May 16, 2023

(54) SYSTEMS AND METHODS FOR AUTOMATED SYSTEM REQUIREMENT ANALYSIS

(71) Applicant: Raytheon BBN Technologies Corp., Cambridge, MA (US)

(72) Inventors: Michael Hassan Atighetchi, Framingham, MA (US); Borislava Ivanova Simidchieva, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 854 days.

(21) Appl. No.: 16/683,185

(22) Filed: Nov. 13, 2019

(65) Prior Publication Data
US 2020/0364343 A1    Nov. 19, 2020

Related U.S. Application Data

(60) Provisional application No. 62/847,604, filed on May 14, 2019.

(51) Int. Cl.
*G06F 21/57* (2013.01)
*G06F 8/10* (2018.01)

(52) U.S. Cl.
CPC ............. *G06F 21/577* (2013.01); *G06F 8/10* (2013.01); *G06F 2221/034* (2013.01)

(58) Field of Classification Search
None
See application file for complete search history.

(56) References Cited

U.S. PATENT DOCUMENTS

| 10,418,036 | B1 * | 9/2019 | Roturier | G10L 15/1822 |
| 2006/0010348 | A1 * | 1/2006 | Bylund | G06F 30/3323 |
| | | | | 714/38.1 |
| 2015/0324491 | A1 * | 11/2015 | Iorio | G06F 8/10 |
| | | | | 703/1 |

OTHER PUBLICATIONS

Natural-Language Processing Support for Developing Policy-Governed Software Systems, ISBN 0-7695-1251-8, publication date Jan. 1, 2001, conference date 1001-07-29, J.B. Michael (Year: 2001).*

(Continued)

*Primary Examiner* — Fatoumata Traore
(74) *Attorney, Agent, or Firm* — Lando & Anastasi, LLP

(57) ABSTRACT

Techniques for automated system requirements analysis are disclosed. A system requirements analysis (SRA) service generates a system model that includes system requirements, at least by performing natural-language processing on a natural-language representation of the system requirements. Based at least on the system model, the SRA service performs an analysis of the system requirements against codified system requirements rules. The SRA service determines, based at least on the analysis of the system requirements against the codified system requirements rules, that the system requirements include a violation of a system requirements rule. The SRA service generates a report that identifies at least (a) the violation of the system requirements rule and (b) a suggested action to remediate the violation of the system requirements rule.

18 Claims, 12 Drawing Sheets

(56) References Cited

OTHER PUBLICATIONS

NASA Johnson Space Center, "Error cost escalation through the project life cycle," National Aeronautics and Space Administration (NASA), <http://ntrs.nasa.gov/archive/nasa/casi.ntrs.nasa.gov/20100036670.pdf>, 2010.

M. Schoenefeld, "Pentesting J2EE," Blackhat, 2006. [Online]. Available: <http://www.blackhat.com/presentations/bh-federal-06/BH-Fed-06-Schoenefeld-up.pdf>.

C. Haley, R. Laney, J. Moffett, and B. Nuseibeh, "Security Requirements Engineering: A Framework for Representation and Analysis," IEEE Trans. Softw. Eng., vol. 34, No. 1, pp. 133-153, Jan. 2008.

B. Nuseibeh, J. Kramer, and A. Finkelstein, "Expressing the Relationships Between Multiple Views in Requirements Specification," in Proceedings of the 15th International Conference on Software Engineering, 1993, pp. 187-196.

C. B. Haley, J. D. Moffett, R. Laney, and B. Nuseibeh, "Arguing security: Validating security requirements using structured argumentation," 2005.

D. K. Deeptimahanti and R. Sanyal, "Semi-automatic generation of UML models from natural language requirements," in Proceedings of the 4th India Software Engineering Conference, 2011, pp. 165-174.

A. Durán, A. Ruiz, B. Bernárdez, and M. Toro, "Verifying software requirements with XSLT," ACM SIGSOFT Software Engineering Notes, vol. 27, No. 1, pp. 39-44, 2002.

J. H. Hayes, "Building a requirement fault taxonomy: Experiences from a NASA verification and validation research project," in 14th International Symposium on Software Reliability Engineering, 2003. ISSRE 2003., 2003, pp. 49-59.

S. Ghosh, D. Elenius, W. Li, P. Lincoln, N. Shankar, and W. Steiner, "ARSENAL: automatic requirements specification extraction from natural language," in NASA Formal Methods Symposium, 2016, pp. 41-46.

L. Ramshaw, E. Boschee, M. Freedman, J. MacBride, R. Weischedel, and A. Zamanian, "Serif language processing effective trainable language understanding," Handbook of Natural Language Processing and Machine Translation: DARPA Global Autonomous Language Exploitation, pp. 636-644, 2011.

S. Miller, H. Fox, L. Ramshaw, and R. Weischedel, "A novel use of statistical parsing to extract information from text," in 1st Meeting of the North American Chapter of the Association for Computational Linguistics, 2000.

M. Marcus, B. Santorini, and M. A. Marcinkiewicz, "Building a large annotated corpus of English: The Penn Treebank," 1993.

T. Strayer et al., "Mission-Centric Content Sharing Across Heterogeneous Networks," presented at the International Conference on Computing, Networking and Communications, 2019.

M. Atighetchi, B. Simidchieva, M. Carvalho, and D. Last, "Experimentation Support for Cyber Security Evaluations," in Proceedings of the 11th Annual Cyber and Information Security Research Conference, 2016, p. 5.

M. Atighetchi, N. Soule, R. Watro, and J. Loyall, "The Concept of Attack Surface Reasoning," in The Third International Conference on Intelligent Systems and Applications, Sevilla, Spain, 2014.

"Apache Tika," Apache Tika. [Online]. Available: <https://tika.apache.org/>. [Accessed: Apr. 3, 2019].

"Tesseract Open Source OCR Engine (main repository)," GitHub—tesseractocr/ tesseract. [Online]. Available: <https://github.com/tesseract-ocr/tesseract>. [Accessed: Apr. 3, 2019].

"A tool that performs comprehensive transformations of XML Schemas (XSD) and XML data to RDF/OWL automatically," GitHub—srdc/ontmalizer. [Online]. Available: <https://github.com/srdc/ontmalizer>. [Accessed: Apr. 3, 2019].

"JFreeChart," JFreeChart. [Online]. Available: <http://www.jfree.org/jfreechart/index.html>. [Accessed: Apr. 3, 2019].

A. Shostack, Threat Modeling: Designing for Security. John Wiley & Sons, 2014.

B. W. Boehm. "Software Engineering Economics," IEEE Transactions on Software Engineering, vo. SE-10, (1984) pp. 4-21.

M. Atighetchi and J. Loyall, "Meaningful and flexible survivability assessments: approach and practice," CrossTalk—The Journal of Defense Software Engineering, vol. 23, No. 2, pp. 13-18, 2010.

A. Van Lamsweerde, Requirements engineering: From system goals to UML models to software, vol. 10. Chichester, UK: John Wiley & Sons, 2009.

F. Brooks. No Silver Bullet: Essence and Accidents of Software Engineering. Apr. 1987.

R. H. Thayer, S. C. Bailin, and M. Dorfman, Software requirements engineering. IEEE Computer Society Press, 1997.

V. R. Basili and D. M. Weiss, "Evaluation of a software requirements document by analysis of change data," in Proceedings of the 5th international conference on Software engineering, 1981, pp. 314-323.

\* cited by examiner

Natural-Language System Requirements 302

| # | Requirement |
|---|---|
| | Functional Requirements |
| 1 | Clients shall access the web server via Internet Explorer |
| 2 | The visualization code running the Internet Explorer shall with J2EE Servlets running in the web server via HTTP |
| 3 | The web server shall use a SQL database for persistence of all data |
| 4 | The web server shall use an Active Directory server to validate credentials during user login |
| | Performance Requirements |
| 5 | (Availability) Latency for client-server requests must be below 50ms |
| 6 | (Scalability) The server must support 100 concurrent requests per second |
| | Security Requirements |
| 7 | (Confidentiality & Integrity) Communication with the web server must be authenticated and encrypted |
| 8 | (Authentication) The web server must validate client certificates and require password resets every 30 |
| 9 | (Audit) All HTTP requests issued by clients must be monitored external to the web server |
| 10 | (Audit) All access interactions must be logged to disk with timestamps included |
| 11 | (Audit) Log records must be uploaded to myAuditRepo once per week |
| 12 | (Audit) The system shall not allow access for cases in which creation of log records fail |
| 13 | (Attribution) All access requests must contain the Subject Name listed in the X509 certificate |
| 14 | (Availability) System outages must be short enough not to interrupt normal usage |
| 15 | (I/O Validation) User input data to the server must be filtered for SQL injection attacks |
| 16 | (I/O Validation) Output sent to the client must be filtered for JavaScript injection attacks |
| 17 | (Confidentiality) User-supplied Personally Identifiable Information (PII) must be encrypted at rest |

FIG. 3

Semantic Triple 402

```
1    PREFIX xsd: <http://www.w3.org/2001/XMLSchema#>
2    PREFIX owl: <http://www.w3.org/2002/07/owl#>
3    PREFIX sys: <http://www.bbn.com/rapids/systemSchema#>
4
5    sys:SERVER_1 .
6    sys:CLIENT_1
7         sys:connectsTo sys:SERVER_1.

Consistency Analysis Query 502

```
1   PREFIX xsd: <http://www.w3.org/2001/XMLSchema#>
2   PREFIX owl: <http://www.w3.org/2002/07/owl#>
3   PREFIX sys: <http://www.bbn.com/rapids/systemSchema#>
4
5   SELECT ?violatingConnections
6   WHERE
7   { ?server a sys:Server .
8     ?flow a sys;InformationFlow .
9     ?flow sys:target ?server .
10    MINUS {?flow sys:hasProperty sys:Encryption}
11  }
```

Gap Analysis Query 504

```
1   PREFIX xsd: <http://www.w3.org/2001/XMLSchema#>
2   PREFIX owl: <http://www.w3.org/2002/07/owl#>
3   PREFIX sys: <http://www.bbn.com/rapids/systemSchema#>
4
5   SELECT ?host
6   WHERE
7   { ?host a sys:Host .
8     MINUS {
8       ?host sys:containsService ?svc .
9       ?svc a sys:AuditingService .
10      ?svc sys:isEnabled "true"
11  }}
```

FIG. 5

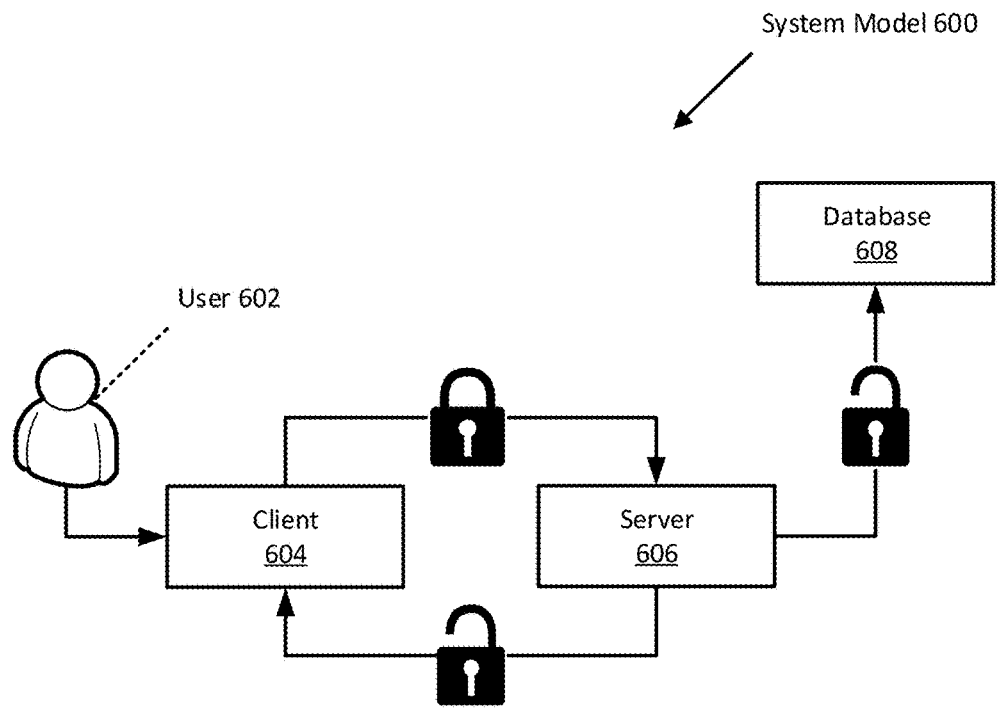

FIG. 6A

Gap Analysis Query 610

```
1    query:
2    PREFIX sys: <http://www.bbn.com/rapids/systemSchema#>
3    SELECT ?flow
4    WHERE {
5         ?flow a sys:InformationFlow .
6         MINUS { ?flow sys:hasProperty sys:Encryption }}
7
8    diagnosisText:
9    "RAPIDS found non-encrypted flows even though
10   requirements dictate that all flows be encrypted. The
11   violating flows are: {?flow}"
12
13   suggestionText:
14   "Try to encrypt flows {?flow} via TLS."
```

FIG. 6B

SYSTEMS AND METHODS FOR AUTOMATED SYSTEM REQUIREMENT ANALYSIS

CROSS-REFERENCE TO RELATED APPLICATIONS

This application claims the benefit of U.S. Provisional Patent Application Ser. No. 62/847,604, titled "Systems and Methods for Automated System Requirement Analysis," filed May 14, 2019, which is hereby incorporated by reference.

TECHNICAL FIELD

This application generally relates to analyzing system requirements and reporting deficiencies in system requirements.

BACKGROUND

System requirements identify requirements (e.g., functional and/or security requirements) applicable to the current or eventual implementation a system (e.g., a system of hardware and/or software). System requirements may also be referred to as system constraints. At the time when system requirements are developed, the system may not have been implemented yet. For example, in a software development lifecycle, system requirements are often formulated before the system is designed and implemented. Many different types of system requirements exist, including but not limited to: confidentiality, integrity, availability, authentication, attribution, audit, persistence, minimization, complexity, stealth, deception, adaptability, isolation, reliability, input/output validation, redundancy, scalability, capacity, heterogeneity, and robustness. System requirements may be represented in natural language format. For example, system requirements may be represented as sentences in a human-readable form in a system requirements document, such as in English or another human language. Natural-language representations of system requirements are often incomplete, imprecise, inconsistent with each other, impracticable, and/or otherwise deficient.

Typically, system requirements are both created and validated manually. Human analysts review system requirements documents and attempt to identify problems in the system requirements. Even when adhering to a formalized system requirements analysis framework, manual review of system requirements documents is a slow, expensive, error-prone process. Manual review of system requirements documents requires the hiring of qualified analysts who may produce work of inconsistent or variable quality. As the complexity of a system and/or the set of system requirements applicable to that system increases, manual review of system requirements becomes increasingly difficult. The thoroughness, accuracy, and consistency of manual system requirements analysis tend to decrease accordingly. While some tools for automated system analysis exist, those tools do not analyze system requirements. Instead, existing tools typically analyze system implementations (e.g., by running a suite of tests against a system that is executing in a test environment), well past the requirements stage. Those implementations may be based on deficient system requirements.

Failure to identify even small deficiencies in system requirements early in a project (e.g., early in a software development lifecycle) may have significant downstream effects. For example, failure to identify a missing security requirement may result in a system vulnerability that is difficult and/or costly to remediate once the system has been implemented. Such a problem might remain undetected until it is maliciously exploited or otherwise affects system functionality. By some estimates, remediating problems in system requirements when the system has already been implemented is 10 to 1,000 times more expensive than identifying those problems at the requirements stage, before design and implementation. In addition, attempting to 'retrofit' a fix may result in an implementation that is less dependable, less secure, and/or more costly to operate and maintain. For example, it is preferable to deploy a well-specified web server initially than to deploy a web server with an undetected vulnerability and subsequently deploy a patch to address the live vulnerability.

As one example, identifying problems in system requirements early in the project life cycle may be beneficial when using Agile software development or other rapid and/or continuous development methodologies, which call for prompt, continuous assessment of system requirements. As another example, identifying problems in system requirements early in the project life cycle may be beneficial when developing mission-critical systems, where defective system requirements may lead to system failures or vulnerabilities with particularly devastating consequences.

Approaches described in this section have not necessarily been conceived and/or pursued prior to the filing of this application. Accordingly, unless otherwise indicated, approaches described in this section should not be construed as prior art.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIG. 3 illustrates an example of natural-language system requirements according to an embodiment;

FIG. 4 illustrates an example of a semantic triple according to an embodiment;

FIG. 5 illustrates examples of queries according to an embodiment;

FIGS. 6A-6C illustrate an example of gap analysis according to an embodiment;

DETAILED DESCRIPTION

Figure 1A:
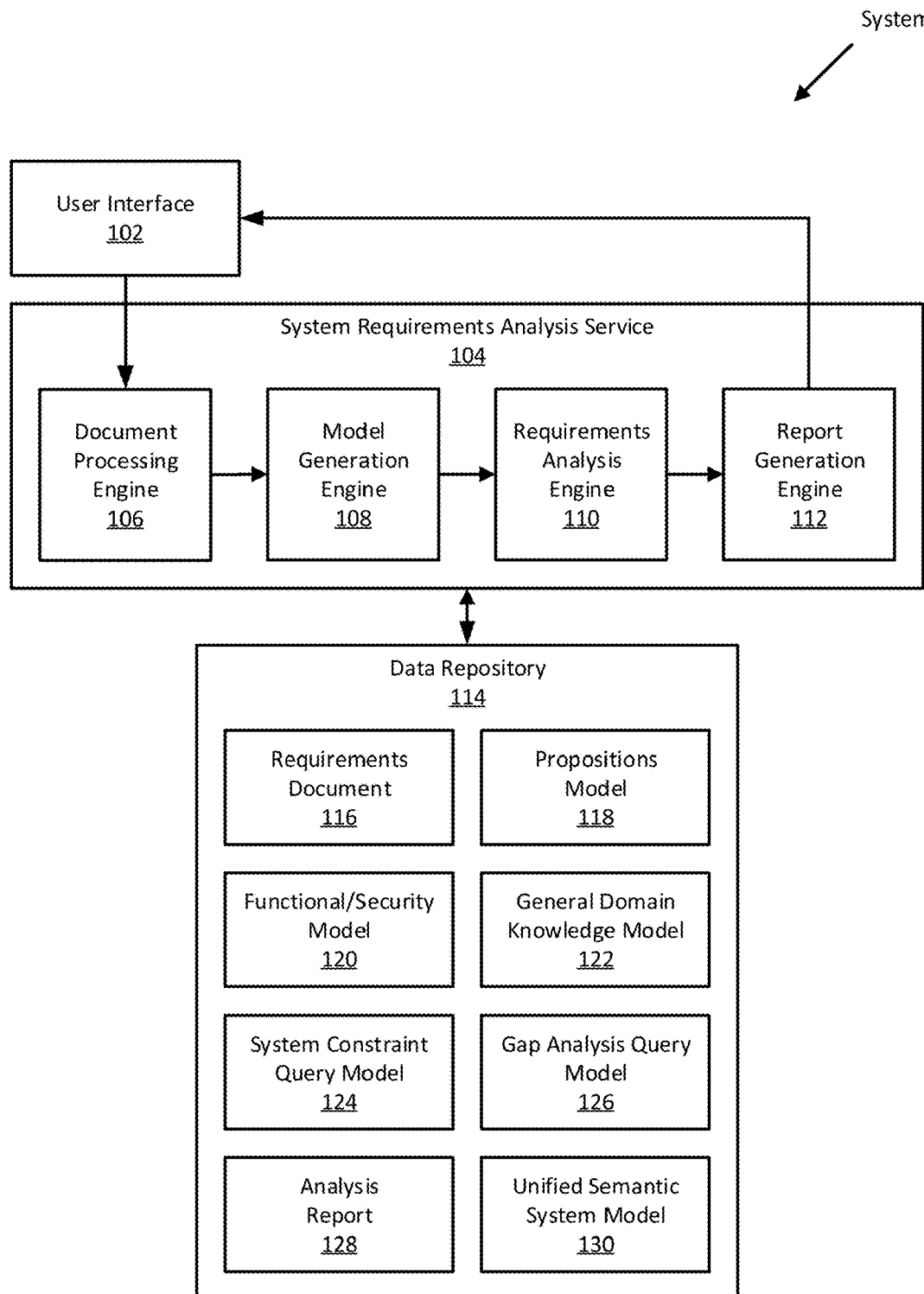
FIG. 1A is a block diagram of an example of a system according to an embodiment.

The following table of contents is provided for the reader's convenience and is not intended to define the limits of the disclosure.
1. GENERAL OVERVIEW
2. SYSTEM ARCHITECTURE
  2.1. SYSTEM OVERVIEW
  2.2. DOCUMENT PROCESSING ENGINE
3. AUTOMATED SYSTEM REQUIREMENTS ANALYSIS
4. ADDITIONAL EXAMPLES
  4.1. SYSTEM REQUIREMENTS
  4.2. SEMANTIC TRIPLE
  4.3. QUERIES
  4.4. GAP ANALYSIS
  4.5. REPORT
  4.6. USER INTERFACE
5. MISCELLANEOUS; EXTENSIONS
6. COMPUTING DEVICES
7. COMPUTER NETWORKS

1. General Overview

One or more embodiments include techniques for automated system requirements analysis. A system requirements analysis (SRA) service is configured to ingest a source document that includes a natural-language representation of system requirements, analyze the system requirements, and generate a report that identifies (a) whether the system requirements violate a system requirements rule, and (b) if so, a suggested remedial action to address the violation. One or more embodiments thus improve the speed, accuracy, and thoroughness of analyzing system requirements.

In an embodiment, supporting natural-language representations of system requirements relieves human analysts of the need to learn new languages, models, and/or ontologies for analyzing system requirements. Starting from a natural-language representation of the system requirements may also allow the SRA service to indicate, in the resulting report, the original text that gave rise to the violation. Embodiments of the SRA service thus provide for rapid and thorough analysis of the original system requirements documents, while facilitating an iterative process of revising the system requirements when violations are identified. Human analysts may be able to devote their time and energy to drafting and refining system requirements based on information provided by the SRA service, rather than the slow and error-prone process of reviewing and validating those same documents.

In an embodiment, the SRA service generates a system model including a plurality of system requirements, at least by performing natural-language processing on a natural-language representation of the plurality of system requirements. The SRA service performs, based at least on the system model, an analysis of the plurality of system requirements against a plurality of codified system requirements rules. The SRA service determines, based at least on the analysis of the plurality of system requirements against the plurality of codified system requirements rules, that the plurality of system requirements includes a violation of a system requirements rule in the plurality of system requirements rules. The SRA service generates a report that identifies at least (a) the violation of the system requirements rule and (b) a suggested action to remediate the violation of the system requirements rule.

In an embodiment, the SRA service generates a revised system model. For example, the SRA service may generate a revised system model based on a revised natural-language representation of the plurality of system requirements. The revised system model includes a revised plurality of system requirements that incorporates the suggested action to remediate the violation of the system requirements rule. The SRA service performs, based at least on the revised system model, a second analysis of the revised plurality of system requirements against the plurality of codified system requirements rules. The SRA service determines, based at least on the second analysis of the revised plurality of system requirements against the plurality of codified system requirements rules, that the revised plurality of system requirements does not violate the system requirements rule. Two or more iterations may be required before determining that a revised plurality of system requirements no longer violates the system requirements rule. In an embodiment, the SRA service generates a provenance trail between the plurality of system requirements and the revised plurality of system requirements. The SRA service may present the provenance trail in a graphical user interface.

In an embodiment, generating the system model includes generating a plurality of semantic triples representing the plurality of system requirements. Generating the plurality of semantic triples may be based at least on a model of propositions representing the plurality of system requirements. Generating the system model may further include generating the model of propositions, at least by parsing text comprising the natural-language representation of the plurality of system requirements. Generating the system model may further include extracting the text from a source document including at least a portion that is not plaintext.

In an embodiment, the first analysis of the plurality of system requirements against the plurality of codified system requirements rules is further based on a general domain knowledge model representing at least one item of general knowledge that is not explicitly represented by the system model. Generating the system model may include incorporating information from the general domain knowledge model with output of the natural-language processing.

In an embodiment, performing the first analysis of the plurality of system requirements includes applying one or more queries in a semantic query language to the system model. The SRA service may generate at least a subset of the one or more queries, based at least on the natural-language processing on the natural-language representation of the plurality of system requirements. The system model may include a set of confidentiality, integrity, and authentication (CIA) constraints, including at least one confidentiality constraint, at least one integrity constraint, and at least one authentication constraint. The one or more queries may represent one or more system constraints beyond the set of CIA constraints.

In an embodiment, the SRA service presents a user interface (e.g., a graphical user interface) configured to receive the natural-language representation of the plurality of system requirements. The SRA service receives via the user interface, a document including the natural-language representation of the plurality of system requirements.

In an embodiment, a violation of a system requirements rule may correspond to one or more of: an under-specified system requirement; a missing system requirement; an ambiguous system requirement; an unquantifiable system requirement; conflicting system requirements; and/or redundant system requirements. A system requirements rule may be a composite rule, i.e., a rule that is based on a combination of two or more other rules.

In an embodiment, the report further identifies a specific portion of the natural-language representation of the plurality of system requirements as a provenance of the violation of the system requirements rule.

In an embodiment, the report includes at least an intermediate level analysis section and a detailed analysis section. The intermediate level analysis section may include, for the violation of the system requirements rule, a user-selectable link to a corresponding portion of the detailed analysis system.

In an embodiment, a system includes one or more processors, and one or more non-transitory computer-readable media storing instructions that, when executed by the one or more processors, cause performance of one or more operations described herein. The system may further include a data repository configured to store semantic triples representing the plurality of system requirements.

In an embodiment, one or more non-transitory computer-readable media store instructions that, when executed by the one or more processors, cause performance of one or more operations described herein.

One or more embodiments described in this Specification and/or recited in the claims may not be included in this General Overview section.

2. System Architecture
2.1. System Overview

FIG. 1A is a block diagram of an example of a system 100 according to an embodiment. In an embodiment, system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In an embodiment, system requirements analysis ("SRA") service 104 refers to hardware and/or software configured to perform operations described herein for automated system requirements analysis. SRA service 104 is configured to receive one or more documents representing system requirements, determine whether the system requirements violate one or more system requirements rules, and generate a report that identifies such violation(s). Examples of operations for automated system requirements analysis are described below.

In an embodiment, user interface 102 refers to hardware and/or software configured to facilitate communications between a user and SRA service 104. Examples of communications between a user and SRA service 104 are described below. User interface 102 renders user interface elements and receives input via user interface elements. User interface 102 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms.

In an embodiment, different components of user interface 102 are specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of user interface 102 may be specified in one or more other languages, such as Java, Python, Perl, C, C++, and/or any other language or combination thereof.

In an embodiment, document processing engine 106 refers to hardware and/or software configured to receive (e.g., via user input to one or more user interface controls of user interface 102) a requirements document 116 that represents system requirements. Requirements document 116 may be formatted as Extensible Markup Language (XML), plaintext, rich text format (RTF), Microsoft® Word document format (e.g., .doc and/or .docx), Portable Document Format (PDF), one or more image files (e.g., one or more scanned and/or computer-generated images), a uniform modeling language (UML) model (e.g., a Sparx™ Enterprise Architect document or other type of UML model), requirements data exported from a requirements management tool (e.g., data exported from IBM® Rational® DOORS® or another requirements management tool), and/or another format or combination thereof. Multiple requirements documents 116 may include system requirements applicable to the same system. Document processing engine 106 may combine multiple requirements documents 116 and/or combine the results of processing multiple requirements documents 116. In an embodiment, document processing engine 106 is configured to receive documents in multiple formats and process documents differently, depending on their respective formats. For example, document processing engine 106 may process a Microsoft® Word document differently than an XML document. Operations performed by document processing engine 106, in accordance with an embodiment, are described in further detail below.

In an embodiment, document processing engine 106 is configured to generate a normalized representation of system requirements, based at least in part on one or more requirements documents 116. The normalized representation of system requirements may include, in whole or in part, a propositions model 118. Propositions model 118 represents system requirements as semantic propositions. A semantic proposition captures the semantics of a statement, such as who did what to whom. Propositions model 118 may represent semantic propositions as triples of subject, predicate, and object. For example, propositions model 118 may store semantic propositions as Resource Description Framework (RDF) triples. Alternatively or additionally, document processing engine 106 may store propositions model 118 in another format. Alternatively or additionally, document processing engine 106 may generate a normalized representation of system requirements in a format other than semantic propositions. Operations described herein with respect to propositions model 118 may also apply, with appropriate modifications, to a normalized representation of system requirements stored in another format.

In an embodiment, propositions model 118 includes metadata relating to entity resolution. The metadata may describe properties of entities represented by propositions model 118 and/or relationships between entities represented by propositions model 118. For example, if requirements document 116 relates to a client-server system, metadata may describe that (a) clients and servers are resource instances of type Host and (b) there is a connectsTo object property linking those resource instances. As described below, model generation engine 108 may use metadata from propositions model 118 to resolve entities, when generating one or more models to be analyzed by requirements analysis engine 110.

In an embodiment, model generation engine 108 refers to hardware and/or software configured to generate one or more models based on propositions model 118. Specifically, model generation engine may map resources represented in propositions model 118 to ontological types and assign semantic meaning to the resolved entities. Model generation engine 108 may generate one or more models of one or more different types. In an embodiment, model generation engine 108 generates at least a functional/security model 120 and a system constraint query model 124. As described below, model generation engine 108 may also generate a unified semantic system model 130. Alternatively or additionally, model generation engine 108 may generate one or more other kinds of models that supply structured input to requirements analysis engine 110.

In an embodiment, model generation engine 108 generates a functional/security model 120. Functional/security model 120 is an ontological system model that identifies functionality and security requirements of the system described in requirements document 116. Functional/security model 120 may include layered representations of processes, entities, and flows that are part of the system addressed by requirements document 116. Security requirements identified by functional/security model 120 may include one or more of: confidentiality requirements; integrity requirements; and/or authentication requirements (collectively, CIA requirements or CIA constraints). In an embodiment, functional/security model 120 includes only CIA requirements that apply to specific system entities, such as a requirement that a particular information flow be encrypted. Other security requirements may be stored in another model, such as system constraint query model 124. Alternatively or additionally, functional/security model 120 may identify one or more security requirements that are not CIA requirements and/or that do not apply to specific system entities.

In an embodiment, model generation engine 108 integrates data from functional/security model 120 with data from a general domain knowledge model 122, to generate a unified semantic system model 130. Whereas functional/security model 120 is based on information obtained from requirements document 116, general domain knowledge model 122 is a separate model storing knowledge that is not derived from requirements document 116. The information in general domain knowledge model 122 may not be specific and/or unique to the system addressed by requirements document 116. Some or all of the information in general domain knowledge model 122 may function as a form of thesaurus for model generation engine 108. For example, general domain knowledge model 122 may include definitions that allow model generation engine 108 to identify different terms referring to the same entity or property. In an embodiment, general domain knowledge model 122 includes knowledge that a human analyst might infer from requirements document 116, based on the human analyst's general technical knowledge and experience, even though that knowledge is not explicitly stated in requirements document 116. Knowledge included in general domain knowledge model 122 may have been omitted from requirements document 116 because that knowledge is assumed to be common industry knowledge that does not need to be explicitly stated for the benefit of an experienced human analyst.

In an embodiment, general domain knowledge model 122 is created by one or more subject matter experts. Rather than generate general domain knowledge model 122, SRA service 104 may receive general domain knowledge model 122 in a pre-generated state, for example, via user input to one or more user interface controls of user interface 102. Alternatively, SRA service 104 may generate general domain knowledge model 122, using techniques described herein, based on a general domain knowledge requirements document (not shown). For example, a subject matter expert may create a document that includes natural-language representations of general domain knowledge and use SRA service 104 to generate general domain knowledge model 122 based on that document.

In one example, general domain knowledge model 122 identifies that an intrusion detection system (IDS) can serve the role of Monitor. A human analyst might treat the two terms as functionally equivalent, even if the functional equivalency is not explicitly stated in requirements document 116. In another example, general domain knowledge model 122 identifies that a virtual private network (VPN) provides encryption and authentication. Encryption and authentication are expected properties of VPN's that might not be explicitly described in requirements document 116.

In an embodiment, to generate unified system model 130, model generation engine 108 retrieves metadata describing entity properties and/or entity relationships from propositions model 118. Model generation engine 108 uses the metadata, along with information from general domain knowledge model 122, to infer entity properties and/or entity relationships that were not explicitly described in requirements document 116. Model generation engine 108 combines the inferred entity properties and/or entity relationships with functional/security model 120, to generate unified semantic system model 130. In an embodiment, unified semantic system model 130 is an augmented model for analysis purposes, relative to functional/security model 120 alone. Unified semantic system model 130 may correspond to a hypothetical model that satisfies all the system requirements rules.

In one example, functional/security model 120 identifies that a system includes a client and server, represented as two entities of type Host. Functional/security model 120 further identifies a connectsTo object property corresponding to a connection between the two Host entities. Using information from general domain knowledge model 122, model generation engine 108 infers the existence of a resource of type InformationFlow, with a source property pointing to the client entity and a destination property pointing to the server entity. In this example, model generation engine 108 may also infer other properties, such as system requirements applicable to the InformationFlow resource, based on general domain knowledge model 122.

In an embodiment, functional/security model 120 and/or unified semantic system model 130 is/are stored as an extensible, user-friendly semantic web graph. An extensible semantic web graphs may support a level of automated reasoning and analysis, and may be easier to generate and understand (including by a human reader), than other types of models such as transition systems. In an embodiment, functional/security model 120 and/or unified semantic system model 130 is/are STRIDE (Spoofing, Tampering, Repudiation, Information disclosure, Denial of service, and Elevation of privilege) models that model information flows for entities and interactions referenced in propositions model 118. STRIDE modeling may provide built-in access to definitions for concepts such as hosts, processes, networks, trust boundaries, etc. that are pertinent to modeling and analyzing system requirements represented by requirements document 116.

In an embodiment, model generation engine 108 is configured to generate a system constraint query model 122. System constraint query model 122 represents requirements from requirements document 116 as queries that can be applied to functional/security model 120 and/or unified semantic system model 130. In an embodiment, system constraint query model 122 represents requirements that are not already modeled in functional/security model 120. For example, as mentioned above, functional/security model 120 may include CIA requirements that apply to specific system entities, and system constraint query model 124 may include queries corresponding to other requirements. For example, if requirement document 116 specifies that the system addressed by requirements document 116 "must" or "shall not" perform a particular action, system constraint query model 124 may include one or more queries to enforce that requirement.

In an embodiment, system constraint query model 124 stores queries in an RDF query language. For example, system constraint query model 124 may include SPARQL Protocol and RDF Query Language (SPARQL) queries. Alternatively or additionally, system constraint query model 124 may store queries in another format.

In an embodiment, in addition to system constraint query model 122, SRA service 104 receives or generates a gap analysis query model 126. Gap analysis query model 126 includes information about requirements corresponding to expectations and/or standards (e.g., organizational and/or industry standards), some or all of which may not be explicitly stated in requirements document 116. For example, gap analysis query model 126 may model requirements that all traffic to internal components should happen over encrypted dataflows, that auditing and/or monitoring functionality should be included, and/or that certain services require authentication. In this example, failure of requirements document 116 to specify that traffic between two or more hosts must be encrypted would constitute a gap in the system requirements. For a given system addressed by requirements document 116, a human analyst could easily lose track of all the information flows and required properties of those information flows, and thus overlook an underspecified or missed requirement. Gap analysis query model 126 captures expected requirements as queries that can be applied to functional/security model 120 and/or unified semantic system model 130. In an embodiment, gap analysis query model 126 thus supplements the system-specific requirements modeled in system constraint query model 124.

In an embodiment, gap analysis query model 126 is created by one or more subject matter experts. Rather than generate gap analysis query model 126, SRA service 104 may receive gap analysis query model 126 in a pre-generated state, for example, via user input to one or more user interface controls of user interface 102. Alternatively, SRA service 104 may generate gap analysis query model 126, using techniques described herein, based on a gap analysis requirements document (not shown). For example, a subject matter expert may create a document that includes natural-language representations of industry standards and/or other general requirements, and use SRA service 104 to generate gap analysis query model 126 based on that document.

In an embodiment, gap analysis query model 126 stores queries in an RDF query language. For example, gap analysis query model 126 may include SPARQL Protocol and RDF Query Language (SPARQL) queries. Alternatively or additionally, gap analysis query model 126 may store queries in another format.

In an embodiment, requirements analysis engine 110 refers to hardware and/or software configured to analyze system requirements, using one or more models generated by model generation engine 108. Analyzing system requirements determines, for a modeled set of system requirements, whether the system requirements violate one or more system requirements rules. A system requirements rule may identify one or more system requirements that must be present (e.g., as described below with respect to gap analysis), and/or expectations with respect to completeness, consistency, practicability, etc. A system requirements rule may be a composite rule, i.e., a rule that is based on a combination of two or more other rules. In an embodiment, requirements analysis engine 110 performs both a gap analysis and a system-specific requirements analysis. As described below, report generation engine 112 may use analysis results generated by requirements analysis engine 110 to generate an analysis report 128.

In an embodiment, requirements analysis engine 110 is configured to perform a gap analysis. Gap analysis identifies expected system requirements that are underspecified and/or missing in the modeled set of system requirements. In an embodiment, to perform a gap analysis, requirements analysis engine 110 applies queries from gap analysis query model 126 to functional security model 120 and/or unified semantic system model 130.

In an embodiment, requirements analysis engine 110 is configured to perform a system-specific requirements analysis. A system-specific requirements analysis may identify problems of different kinds than those identified in a gap analysis. For example, a system-specific requirements analysis may identify a system requirement that is ambiguous, unnecessary, infeasible, untraceable, non-atomic, and/or unquantified. Alternatively or additionally, a system-specific requirements analysis may identify two or more system requirements that are conflicting, redundant, overlapping, dependent, and/or circular. A system-specific requirements analysis may identify many different kinds of violations of system requirements rules and/or combinations thereof. In an embodiment, to perform a system-specific requirements analysis, requirements analysis engine 110 applies queries from system constraint query model 124 to functional security model 120 and/or unified semantic system model 130.

In an embodiment, requirements analysis engine 110 is configure to determine, for one or more violations of system requirements rules, one or more suggested remedial actions to address the violation(s). Remedial actions may be associated with specific queries, such that when the result of a query identifies a violation, requirements analysis engine 110 obtains the recommended remedial action associated with that query.

In an embodiment, requirements analysis engine 110 is configured to provide, for a violation of a system requirements rule, a corresponding description of the violation and/or a description of a recommended remedial action to address the violation. Requirements analysis engine 110 may obtain text describing the violation and/or text describing the recommended remedial action from the query that identified the violation. Specifically, the query may include text to be used when the result of the query indicates a violation. In addition, the text describing the violation and/or recommended remedial action may include one or more placeholders for context-specific information. Requirements analysis engine 110 may be configured to populate the placeholder(s) with context-specific information associated with a specific instance of applying the query. In one example, a query includes text corresponding to a description of a violation and a placeholder to identify an entity for which the violation was identified. If applying the query to a particular entity identifies the violation, then requirements analysis engine 110 populates the placeholder with information about that particular entity. Requirements analysis engine 110 may be configured to populate different kinds of placeholders with different kinds of information.

In an embodiment, report generation engine 112 refers to hardware and/or software configured to generate an analysis report 128, using analysis results generated by requirements analysis engine 110. Analysis report 128 may include many different kinds of information relating to system requirements. Analysis report 128 may include information about one or more violations, by the system requirements represented in requirements document 116, of one or more system requirements rules. Analysis report 128 may include a suggested remedial action to address a violation of a system requirements rule. The suggested remedial action may supply guidance, in natural language, on what changes (e.g., changes to requirements document 116) may successfully remediate the violation. As discussed above, the suggested remedial action may be associated with a particular query, with context-specific information provided by requirements analysis engine 110. Report generation engine 112 may generate the report as a PDF document, Microsoft® Word document, plaintext document, web page (e.g., a web page encoded as hypertext markup language (HTML)), or another format or combination thereof.

Analysis report 128 may include multiple sections that supply information at varying levels of detail. In an embodiment, analysis report 128 includes a summary section that supplies a high-level summary of SRA results. A high-level summary may include statistics, such as a total number of violations identified, numbers of violations broken down by violation type, a score based on a number of violations found and their severity, and/or another kind of statistic or combination thereof. Alternatively or additionally, a high-level summary may include information about requirements document 116, such as a file name, version, date, user who provided requirements document 116, and/or other information about requirements document 116. Alternatively or additionally, a high-level summary may include information about configuration files that were used to perform system requirements analysis the report. For example, a user-created general domain knowledge model 122 or gap analysis query model 126 the may be referred to as a configuration file. A high-level summary may include information about the user-created model, such as a file name, version, date, user who created and/or supplied the model to SRA service 104, and/or other information about the model. A high-level summary and/or other portion of analysis report 128 may represent information about system requirements analysis in one or more plots and/or charts.

In an embodiment, analysis report 128 includes an intermediate-level analysis that provides data about key findings, without excessive details. As one example, an intermediate-level analysis may include a chart or table that organizes violations by type. As another example, an intermediate-level analysis may include a chart or table that organizes violations based on the security properties that they violate. Analysis report 128 may associate different violations with corresponding violation identifiers (ID's). Violations identified in an intermediate-level analysis may include user-selectable links (e.g., user-selectable violation ID's and/or other user interface elements associated with specific violations) that, when selected, direct a user to more detailed information about those violations (e.g., in a detailed analysis section as described below).

In an embodiment, analysis report 128 includes a detailed analysis section that provides full details about each violation. A detailed analysis section may include provenance data that maps a specific violation to the original text of requirements document 116 (e.g., a particular natural-language sentence) that gave rise to the violation. Provenance data may help one or more users (e.g., analysts and/or system requirements engineers) to evaluate and make changes to the appropriate portions of requirements document 116 when violations occur. Alternatively or additionally, a detailed analysis section may include a graphical representation of the portion(s) of propositional model 118 that is/are relevant to a particular violation. Alternatively or additionally, a detailed analysis section may identify a specific query that, when applied to functional/security model 120 and/or unified semantic system model 130, identified the violation.

Information described above with respect to a particular section of analysis report 128 may alternatively or additionally be included in other sections. Analysis report 128 may include more or fewer sections than those described above. Different sections of analysis report 128 may be logically distinct without being explicitly labeled as such. The particular configuration of sections described above is one example and should not be construed as limiting one or more embodiments.

In an embodiment, techniques described herein for generating analysis report 128 support a process of iterative refinement of system requirements. For example, based on one or more violations identified in analysis report 128, requirements document 116 and/or general domain knowledge model 122 may be revised (e.g., by a human analyst, system requirements engineer, automated process, and/or another human or computer-operated entity or combination thereof). SRA service 104 may then analyze requirements document 116 again, to determine whether the violation still exists. In general, subsequent versions of requirements document 116 and/or general domain knowledge model 122 are expected to be more thorough, accurate, and/or practicable than earlier versions. Subsequent instances of analysis report 128 may include provenance data that documents changes to requirements document 116 and/or general domain knowledge model 122 over time.

In an embodiment, a data repository 114 is any type of storage unit and/or device (e.g., a file system, database, collection of tables, or any other storage mechanism) for storing data. A data repository 114 may include multiple different storage units and/or devices. The multiple different storage units and/or devices may or may not be of the same type or located at the same physical site. Further, a data repository 114 may be implemented or may execute on the same computing system as one or more other components of the system 100. Alternatively or additionally, a data repository 114 may be implemented or executed on a computing system separate from one or more other components of the system 100. A data repository 114 may be logically integrated with one or more other components of the system 100. Alternatively or additionally, a data repository 114 may be communicatively coupled to one or more other components of the system 100 via a direct connection or via a network. In FIG. 1A, a data repository 114 is illustrated as storing various kinds of information. Some or all of this information may be implemented and/or distributed across any of the components of the system 100. However, this information is illustrated within the data repository 114 for purposes of clarity and explanation.

In an embodiment, as described above, propositions are represented as semantic triples. Data repository 114 may include a triplestore, i.e., a database that is specifically configured to store semantic triples and retrieve semantic triples through semantic queries. The triplestore may be an RDF store configured to store and retrieve RDF triples.

In an embodiment, one or more components of system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2.2. Document Processing Engine

Figure 1B:
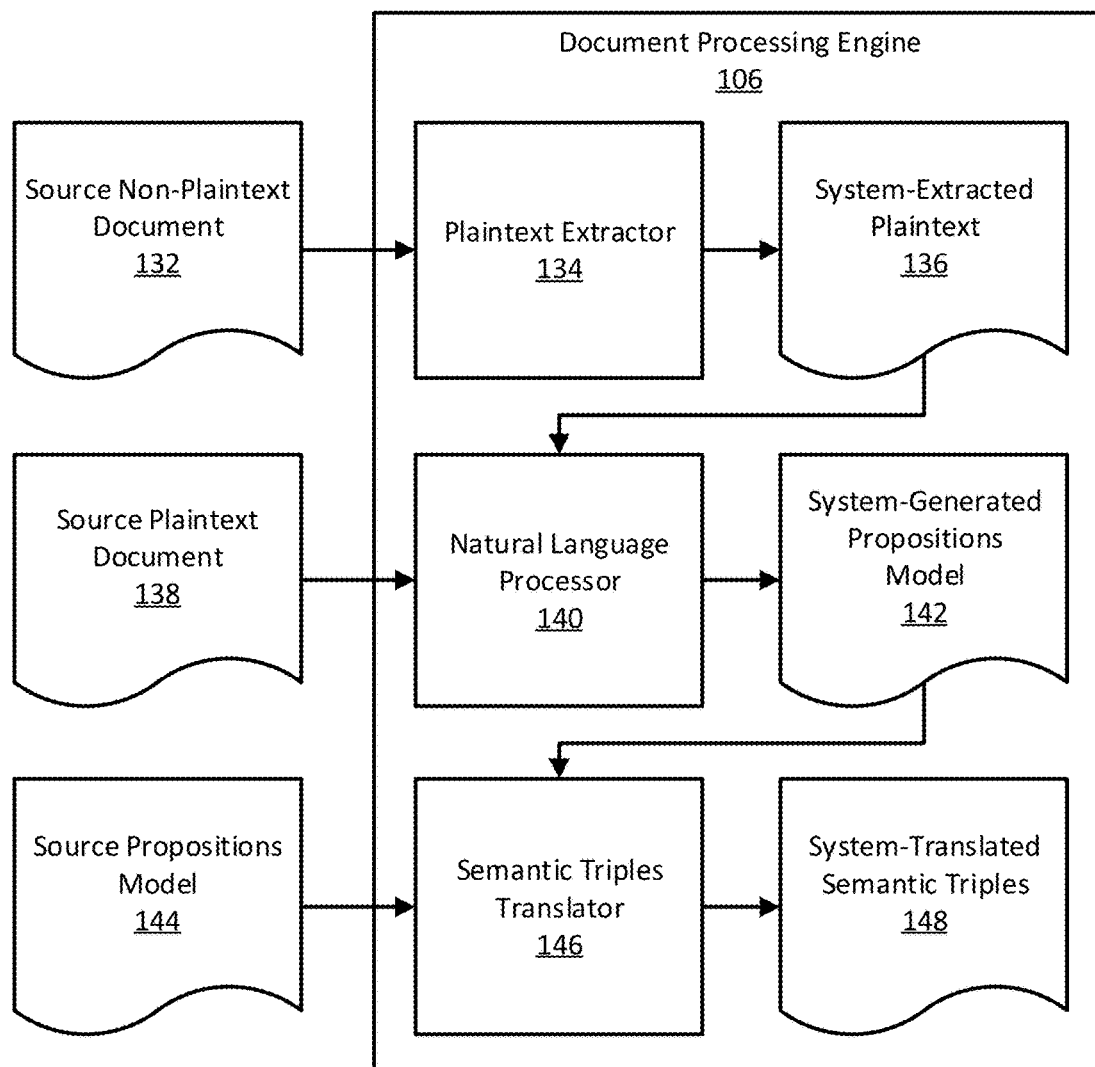
FIG. 1B is a block diagram of an example of a document processing engine according to an embodiment.

FIG. 1B is a block diagram of an example of a document processing engine 106 according to an embodiment. In an embodiment, document processing engine 106 may include more or fewer components than the components illustrated in FIG. 1B. The components illustrated in FIG. 1B may be local to or remote from each other. The components illustrated in FIG. 1B may be implemented in software and/or hardware. Each component may be distributed over multiple applications and/or machines. Multiple components may be combined into one application and/or machine. Operations described with respect to one component may instead be performed by another component.

Document processing engine 106 may be configured to process documents received in one or more different formats. In an embodiment, document processing engine 106 is configured to process a source non-plaintext document 132 that includes a natural-language representation of system requirements. The source non-plaintext document 132 may include one or more portions that are extractable as plaintext, but source non-plaintext document 132 is not itself a plaintext document. For example, source non-plaintext document 132 may be a Microsoft® Word document, RTF document, PDF document, or other type of document from which plaintext can be extracted.

In an embodiment, document processing engine 106 includes a plaintext extractor 134. Plaintext extractor 134 is configured to extract system-extracted plaintext 136 from source non-plaintext document 132. System-extracted plaintext 136 includes the natural-language representation of system requirements in plaintext format. Document processing engine 106 may include multiple plaintext extractors 134 that are configured to extract plaintext from different document types. For example, document processing engine 106 may include one plaintext extractor 134 for Microsoft® Word documents and another plaintext extractor 134 for PDF documents. A plaintext extractor 134 for documents that do not encode system requirements as text (e.g., flat PDF documents, image files, etc.) may include optical character recognition (OCR) processing, to extract plaintext from images that represent text.

In an embodiment, document processing engine 106 includes a natural language processor 140. Natural language processor 140 is configured to generate a system-generated propositions model 142, based on a natural language representation of system requirements. The natural language representation of system requirements may be system-extracted plaintext 136. Alternatively, document processing engine 106 may be configured to receive and process a source plaintext document 138 directly. Source plaintext document 138 may be a document that encodes text in American Standard Code for Information Interchange (ASCII) format, Unicode, and/or another plaintext format or combination thereof.

In an embodiment, natural language processor 140 parses plaintext to extract and represent information as triples of propositions. Specifically, natural language processor 140 may parse plaintext to identify parts of speech and how the parts of speech are grouped into syntactic constituents such as noun phrases and verb phrases. Natural language processor 140 may apply heuristic rules to collapse semantically equivalent parses into a single representation. For example, active and passive constructions may have different parses that natural language processor 140 resolves into identical propositions. Alternatively or additionally, natural language processor 140 may execute a coreference analysis to identify multiple references, across the same or different plaintext sources, that refer to the same entity.

In an embodiment, natural language processor 140 uses a semantic analysis model that is trained for one or more particular natural languages (e.g., English, Spanish, Japanese, German, French, Italian, etc.). Natural language processor 140 may use multiple semantic analysis models to process text in corresponding different natural languages. Alternatively or additionally, natural language processor 140 may be extended by training a semantic analysis model on a natural language that was not previously supported.

In an embodiment, natural language processor 140 generates system-generated propositions model 142 as an XML model of semantic propositions, which document processing engine 106 subsequently translates into RDF triples. Alternatively, natural language processor 140 may generate system-generated propositions model 142 as RDF triples directly, or as another format that models semantic propositions.

In an embodiment, natural language processor 140 uses features of Raytheon® BBN SERIF, which is a natural language processing system that parses text and produces an XML model of semantic propositions. SERIF uses a generative lexicalized probabilistic context-free grammar model that is trained on the Penn Treebank. SERIF is capable of processing text from many different types of sources, including newswire, broadcast news, email, meeting transcripts, and conversation transcripts. SERIF is robust to noisy input, such as noise introduced by speech recognition, OCR, and/or automated machine translation between different languages. Techniques used by SERIF include sentence segmentation, word tokenization, entity coreference, relation, and event extraction. SERIF maintains the provenance of extracted information as character offset spans, allowing for tracing back from propositional models through parse trees to the source text. In an embodiment, natural language processor 140 does not use SERIF, but may use techniques similar to one or more features of SERIF described above.

In an embodiment, document processing engine 106 includes a semantic triples translator 146. Semantic triples translator 146 is configured to translate a propositions model into system-translated semantic triples 148. The propositions model may be system-generated propositions model 142. Alternatively, document processing engine 106 may be configured to receive and process a source propositions model 144 directly. For example, document processing engine 106 may be configured to receive an XML document that represents semantic propositions, and translate the XML document into system-translated semantic triples 148. In an embodiment, system-translated semantic triples 148 is a set of RDF triples.

In an embodiment, system-translated semantic triples 148 maintains a graph structure from the propositions model (e.g., a graph structure generated by SERIF). Semantic triples translator 146 may use XML schema introspection to translate XML into semantic triples. For example, semantic triples translator 146 may use Ontmalizer to perform this function.

In an embodiment, semantic triples translator 146 generates mappings between different words and their corresponding representations. In one example, system requirements language refers to clients, server, hosts, and machines. In this example, semantic triples translator 146 maps these terms to the same type (e.g., a Host type) in the ontology. In another example, system requirements language uses different terms to refer to connections between Host resources (e.g., "connects to," "communicates with," "interacts with," "depends on," etc.). In this example, semantic triples translator 146 maps these terms to the same predicate (e.g., connectsTo). In an embodiment, to generate mappings between words and their corresponding representations, semantic triples translator 146 applies mapping rules provided by a subject matter expert, for example in a configuration file. Model generation engine 108 may be configured to make a second pass at resolving untranslated entities, by applying information from general domain knowledge model 122 to the system-translated semantic triples 148 provided by document processing engine 106. If system-translated semantic triples 148 still includes unresolved entities after all the available resolution techniques have been attempted, the unresolved entities may be identified in analysis report 128.

3. Automated System Requirements Analysis

Figure 2A:
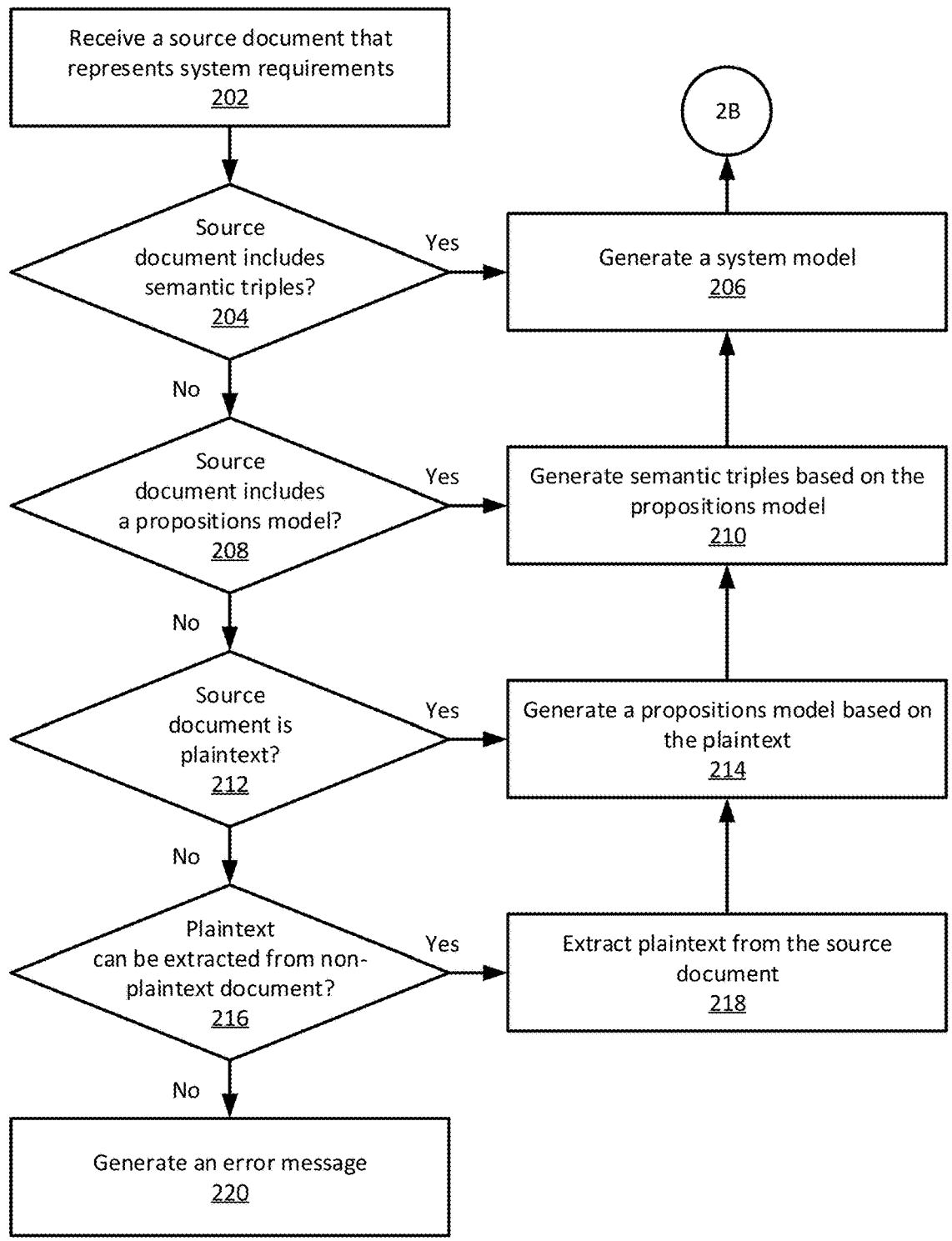
FIGS. 2A-2B are a flow diagram of an example of operations for automated system requirements analysis according to an embodiment.
Figure 2B:
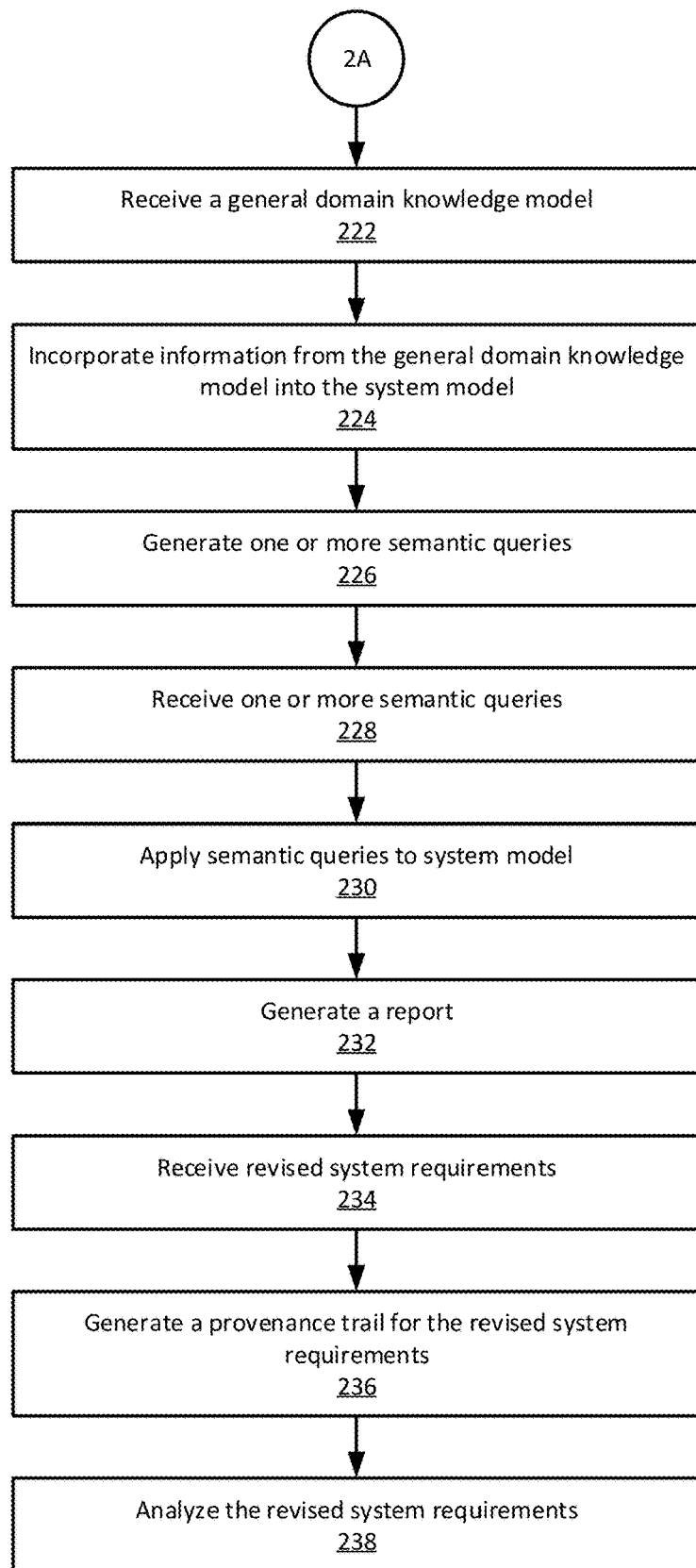

FIGS. 2A-2B are a flow diagram of an example of operations for automated system requirements analysis according to an embodiment. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In an embodiment, a system requirements analysis (SRA) service receives a source document that represents system requirements (Operation 202). The SRA service may receive the source document via user input to a user interface, as described herein. The source document may take many different forms, and the SRA service may be configured to process the source document in different ways, depending on the form of the source document.

In an embodiment, the SRA service determines whether the source document includes semantic triples (Operation 204). For example, the source document may encode a set of RDF triples and/or semantic triples in another format or combination thereof. If the source document includes semantic triples, then the SRA service may generate a system model based on the semantic triples in the source document (Operation 206). Specifically, in an embodiment, the SRA service generates a functional/security model based on the semantic triples in the source document. Alternatively, if the SRA service generates semantic triples as described below, then the SRA service may generate the system model based on the system-generated semantic triples. Alternatively or additionally, the SRA service may generate a system constraint query model based on the semantic triples, as described below.

In an embodiment, the SRA service determines whether the source document includes a propositions model (Operation 208). For example, the source document may encode semantic propositions in XML and/or another format. If the source document includes a propositions model, then the SRA service may generate semantic triples based on the propositions model (Operation 210). For example, the SRA service may generate RDF triples based on the propositions model. Alternatively, if the SRA service generates a proposition model as described below, then the SRA service may generate semantic triples based on the system-generated propositions model. The SRA service may use the system-generated semantic triples to generate a system model (Operation 206), as described above.

In an embodiment, the SRA service determines whether the source document is a plaintext document (Operation 212). For example, the source document may be a text file encoded in ASCII format, Unicode, and/or another plaintext format or combination thereof. If the source document is a plaintext document, then the SRA service may generate a propositions model based on the plaintext (Operation 214). For example, the SRA service may generate XML that represents the system requirements as propositions. Alternatively, if the SRA service extracts plaintext from a non-plaintext document as described below, then the SRA service may generate the propositions model based on the system-extracted plaintext. The SRA service may use the system-generated propositions model to generate semantic triples (Operation 210), as described above.

In an embodiment, the SRA service determines whether the source document is a non-plaintext document from which plaintext can be extracted (Operation 216). For example, the source document may be a Microsoft® Word document, PDF, or other non-plaintext document from which plaintext can be extracted. If the source document is a non-plaintext document from which plaintext can be extracted, then the SRA service may extract plaintext from the source document (Operation 218). The SRA service may use the system-extracted plaintext to generate a propositions model (Operation 214), as described above.

In an embodiment, if the source document is not in a format supported by the SRA service, then the SRA service generates an error message (Operation 220). The error message indicates that the SRA service was unable to process the source document. The SRA service log the error message and/or present the error message to a user in a user interface.

In an embodiment, the SRA service receives a general domain knowledge model (Operation 222). The SRA service may receive the general domain knowledge model via user input to a user interface, as described herein. The user interface may be an application programming interface (API) configured to receive/ingest data (e.g., a document or other file) that represents the general domain knowledge model. In an embodiment, the SRA service incorporates information from the general domain knowledge model into the system model (Operation 224). Specifically, the SRA service may incorporate data from the general domain knowledge model into a functional/security model. Incorporating information from the general domain knowledge model into the system model produces a unified semantic system model, as described above.

In an embodiment, the SRA service generates one or more semantic queries (Operation 228). Specifically, the SRA service may generate a system constraint query model, based on semantic triples derived from a set of system requirements. In addition, in an embodiment, the SRA service receives one or more semantic queries (Operation 228). Specifically, the SRA service may receive a gap analysis query model. The SRA service may receive the gap analysis query model via user input to a user interface, as described herein.

In an embodiment, the SRA service applies semantic queries to the system model (Operation 230). The SRA service may apply semantic queries from a system constraint query model, to perform a system-specific requirements analysis. Alternatively or additionally, the SRA service may apply semantic queries from a gap analysis query model, to perform a gap analysis. The SRA service may apply the semantic queries to a functional/security model. Alternatively or additionally, if the SRA service generated a unified semantic system model, then the SRA service may apply the semantic queries to the unified semantic system model.

In an embodiment, the results of applying semantic queries to a system model indicate whether the system requirements violate one or more system requirements rules. A query may indicate a violation of a system requirements rule if the query is satisfied, i.e., produces one or more affirmative results. Alternatively, a query may indicate a violation of a system requirements rule if the query is not satisfied, i.e., does not produce any results. Alternatively, a query may indicate a violation of a system requirements rule if the query produces a particular number of results and/or a particular result value. Queries may take many different forms. Many different types of queries and/or combinations thereof may be used.

In an embodiment, the SRA service generates a report (Operation 232). The report indicates whether the system requirements represented in the source document violate any system requirement rules. In addition, for a given violation of a system requirements rule, the report may indicate one or more suggested actions to address the violation. The SRA service may store the report and/or present the report to a user, e.g., via a user interface.

In an embodiment, the SRA service receives revised system requirements (Operation 234). Specifically, the SRA service receives another source document, in which the revised system requirements include at least one revision relative to the system requirements that were previously analyzed. For example, if the source document was a Microsoft® Word document, the revised system requirements may be a revised Word document. In an embodiment, one or more of the revisions correspond to a suggested action, from the previously generated report, to address a violation of a system requirements rule. For example, if the report indicated that a particular system requirement was missing, the revised system requirements may include the system requirement that was previously missing.

In an embodiment, the SRA service generates a provenance trail for the revised system requirements (Operation 236). Specifically, the SRA service may store metadata associated with different versions of the system requirements, such as dates, version numbers, users who provided the different versions, etc. The SRA service may thus maintain a history of the different versions, which provides a provenance trail for auditing and/or reporting purposes.

In an embodiment, the SRA service analyzes the revised system requirements (Operation 238). Specifically, the SRA service may repeat operations described above for processing the revised source document, analyzing the revised system requirements represented in the revised source document, and generating another report based on analysis of the revised system requirements. If the revised system requirements successfully address a violation of a system requirements rule that was present in the earlier version of the system requirements, then the new report may indicate that the violation was corrected. The report may indicate that the violation was corrected either explicitly (e.g., with reference to the earlier report), or implicitly by omission of any description corresponding to that violation. The SRA service may analyze multiple versions of the system requirements over time, in an iterative process designed to improve the thoroughness, accuracy, and/or practicability of the system requirements.

4. Additional Examples

Detailed examples are described below for purposes of clarity. Components and/or operations described below should be understood as examples that may not be applicable to one or more embodiments. Accordingly, components and/or operations described below should not be construed as limiting the scope of one or more embodiments.

4.1. System Requirements

FIG. 3 illustrates an example of natural-language system requirements 302 according to an embodiment. Natural-language system requirements 302 describe functional requirements of the system in question: which components communicate with each other, for which purpose, and using which protocols. In addition, natural-language system requirements 302 describe performance requirements, establishing expectations for latency, throughput constraints, etc. In addition, natural-language system requirements 302 describe security requirements relating to confidentiality, integrity, availability, etc.

FIG. 3 illustrates an example of how system requirements may be subject to misinterpretation and/or oversight by a human analyst. Requirement 7 mandates authentication and encryption of traffic between clients and the web server. However, a human analyst may overlook requirement 7, thinking that because all the devices are within the organization's own network, physical connectivity to the network is sufficient to secure interactions between clients and the web server. Based on that oversight, an implementation may fail to secure traffic using a virtual private network (VPN), HTTPS, or other method of securing traffic between entities. Thus, the oversight may expose the system to intrusion by malicious actors (e.g., using a denial of service attack). One or more embodiments described herein do not make such assumptions, unless explicitly stated in the system requirements and/or a general domain knowledge model, and therefore would not overlook requirement 7.

In addition, FIG. 3 illustrates an example of how two different requirements may be incompatible. Requirement 7 can be fulfilled, for example, using a VPN and/or HTTPS. Requirement 8 (client certificates) necessitates TLS. Requirement 9 (auditing) requires external monitoring by an external intrusion detection system (IDS). The combination of these requirements is impracticable, since transport layer security (TLS) used in HTTPS is incompatible with traffic monitoring. A human analyst may overlook this incompatibility, resulting in an inconsistent set of requirements that may not be uncovered until some or all of the system has already been implemented. One or more embodiments described herein would identify this incompatibility as a violation of a system requirements rule.

In addition, FIG. 3 illustrates an example of how requirements may be ambiguous. Requirement 15 (input/output validation) is ambiguous, because it is not clear whether the requirement applies to the front-end web server, the database server, the authentication server, and/or all servers. If requirement 15 were interpreted as applying only to the database server, for example, then the system may be vulnerable to intrusion by malicious actors (e.g., via Java Virtual Machine (JVM) injection). One or more embodiments described herein would identify this ambiguity as a violation of a system requirements rule.

Requirement 14 (availability) also is ambiguous, because it is defined qualitatively: system outages must be "short enough" not to interrupt "normal" usage. Depending on the system, restoring access to components may be required on the order of minutes, seconds, or less. Thus, quantitative terms are needed to disambiguate this requirement. One or more embodiments described herein would identify this ambiguity as a violation of a system requirements rule.

4.2. Semantic Triple

FIG. 4 illustrates an example of a semantic triple 402 according to an embodiment. In this example, line numbers are provided for the reader's convenience only. As illustrated in FIG. 4, semantic triple 402 uses an XML schema defined by the World Wide Web Consortium (W3C). In addition, semantic triple 402 uses the W3C Web Ontology Language (OWL), as well as a system schema published by Raytheon® BBN. In this example, semantic triple 402 describes a connection relationship ("connectsTo") between a client entity ("CLIENT_1") and a server entity ("SERVER_1"). One or more embodiments may use different schemas and/or represent semantic triples in different ways.

4.3. Queries

FIG. 5 illustrates examples of queries according to an embodiment. Specifically, FIG. 5 illustrates an example of a consistency analysis query 502 and a gap analysis query 504. As with semantic triple 402 of FIG. 4, both queries use the W3C XML schema, the W3C OWL schema, and a Raytheon® BBN system schema. One or more embodiments may use different schemas and/or represent queries in different ways. Failure of either query to return a result would indicate a violation of the corresponding system requirements rule.

As illustrated in FIG. 5, consistency analysis query 502 is a SPARQL query that identifies violations of a system requirement that all communication to servers must be encrypted. Specifically, consistency analysis query 502 enumerates all flows to all servers and then subtracting the flows that are encrypted (i.e., have the "Encryption" property). The remaining flows form the set of unencrypted connections to servers. A system may include many such queries directed, respectively, to different system requirements. Consistency analysis may include running some or all of those queries (e.g., consistency analysis query 502) to identify violations of the system requirements.

As illustrated in FIG. 5, gap analysis query 504 is a SPARQL query that identifies hosts that do not have an auditing service enabled. Specifically, gap analysis query 504 enumerates all hosts and subtracts the hosts that do not have an enabled auditing service. Enabling auditing services on all hosts is an example of a general requirement that is often forgotten and not explicitly stated in a system requirements document. A system may include many such queries directed, respectively, to different gaps that may be identified in gap analysis. Gap analysis may include running some or all of those queries (e.g., gap analysis query 504) to identify those gaps.

4.4. Gap Analysis

Figure 6C:
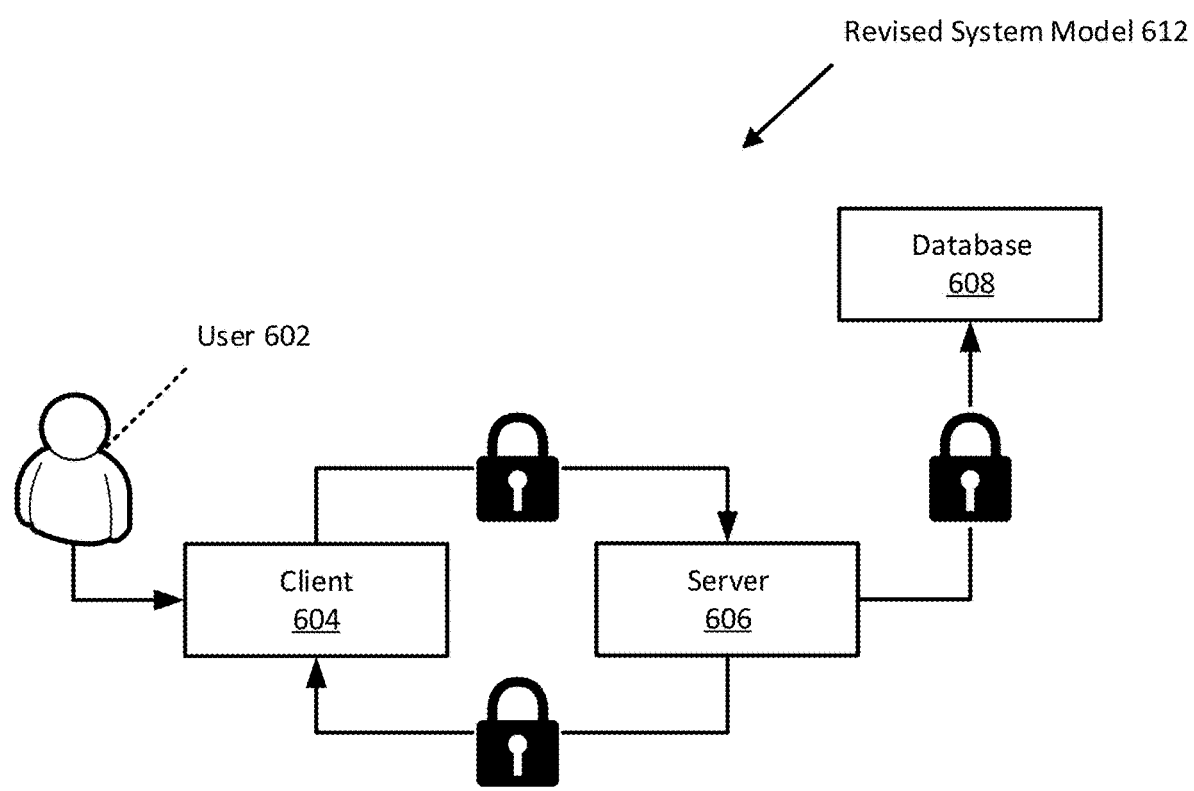

FIGS. 6A-6C illustrate an example of gap analysis according to an embodiment. FIG. 6A illustrates a system model 600, in diagram form, based on a subset of the natural-language system requirements 302 of FIG. 3. Specifically, system model 600 is based on requirement 1 ("Clients shall access the web server via Internet Explorer"), requirement 3 ("The web server shall use a SQL database for persistence of all data"), and requirement 7 ("Communication with the web server must be authenticated and encrypted"). Based on the explicit text of the system requirements, the locked padlock indicates a requirement that traffic from client 604 to server 606 must be encrypted. In the underlying semantic model, this requirement is represented as the source entity for the InformationFlow from client 604 to server 606 having an object property linked to the Requirement resources of types Confidentiality and Authentication. However, as indicated by the unlocked padlocks, the system requirements do not explicitly state (a) that traffic from server 606 to client 604 must be encrypted or (b) that traffic from server 606 to database 608 must be encrypted.

FIG. 6B illustrates an example of a gap analysis query 610 according to an embodiment. In an embodiment, queries (e.g., gap analysis query 612) are stored according to a schema of "constraint: <query>, <diagnosisText>, <suggestionText>". If the constraint (i.e., system requirement identified by <query> is not satisfied, then the system supplies a description of the violation as <diagnosisText> and further supplies a suggested remedial action as <suggestionText>. In this example, gap analysis query 610 enforces a system requirement that all flows must be encrypted. Thus, applying gap analysis query 610 to system model 600 in FIG. 6A would identify violations in (a) the flow from server 606 to client 604 and (b) the flow from server 606 to database 608. Gap analysis query 610 includes placeholders in both the diagnosis text and the suggested remedial action, to identify the specific flows that require remedial action.

FIG. 6C illustrates a revised system model 612, in diagram form, after the system requirements document has been revised to require that all flows be encrypted. Revised system model 612 is generated based on the revised system requirements. In revised system model 612, all of the flows are encrypted. Applying gap analysis query 610 to revised system model 612 would not identify any violations, and a system implemented based on the revised system requirements would be more secure than a system implemented based on the original system requirements in encryption was not required for all flows.

4.5. Report

Figure 7:
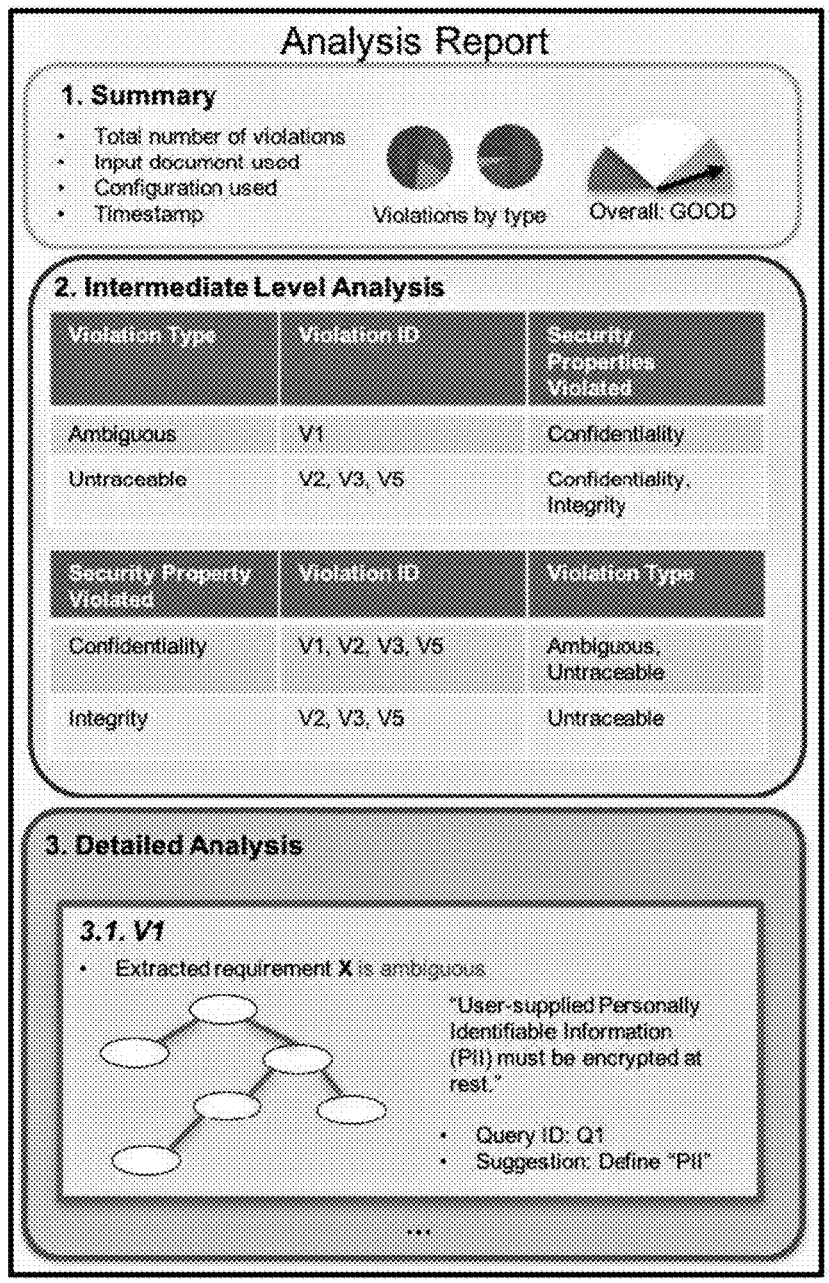
FIG. 7 illustrates an example of a report according to an embodiment.

FIG. 7 illustrates an example of a report 700 according to an embodiment. As illustrated in FIG. 7, report 700 includes a summary analysis section 702. Summary analysis section 702 supplies a high-level summary of analysis results. Specifically, summary analysis section 702 summarizes the total number of violations, identifies the source document and configuration used, the time when the analysis was performed, charts breaking down the violations by type, and an overall score for the set of system requirements that was analyzed. In addition, report 700 includes an intermediate level analysis section 704. Intermediate level analysis section 704 lists the specific violations that were identified, including their types and which security properties were violated. Intermediate level analysis section 704 lists the same violations in two different tables: one sorted by violation type and the other sorted by security property violated. In addition, each violation is assigned a violation ID (V1 through V5) which, when selected, take the user to a corresponding portion of a detailed analysis section 706. Detailed analysis section 706 provides full details about the selected violation (V1 in this example). Specifically, detailed analysis section 706 indicates the type of the violation (ambiguous), the original system requirements text that violated the system requirements rule ("User-supplied Personally Identifiable Information (PII) must be encrypted at rest."), an identifier corresponding to the semantic query that identified the violation, and a suggested remedial action ("Define 'PII'").

4.6. User Interface

Figure 8:
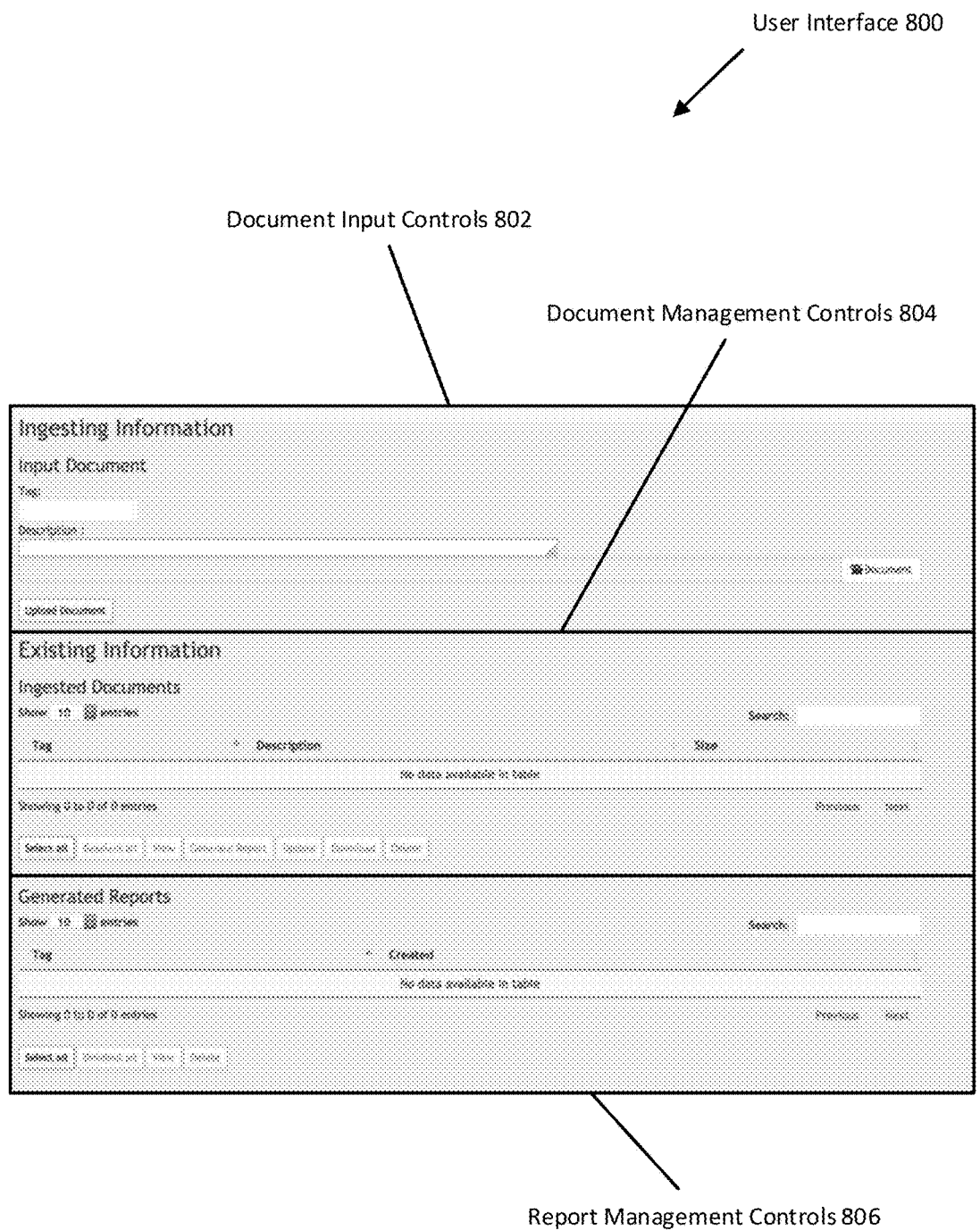
FIG. 8 illustrates an example of a user interface according to an embodiment.

FIG. 8 illustrates an example of a user interface 800 according to an embodiment. User interface 800 provides user interface controls for managing source documents and/or reports. Document input controls 802 are user interface controls that allow a user to select a source document (e.g., a Microsoft® Word document that includes a natural-language representation of system requirements) from their computer system and upload the source document to the SRA service. In addition, document input controls 802 allow the user to supply one or more document tags and/or a more detailed document description for the source document being uploaded. Document management controls 804 are user interface controls that allow a user to view a list of source documents that have already been uploaded, view the contents of one or more selected source documents, generate one or more analysis reports based on one or more selected source documents, update one or more selected source documents (e.g., by uploading a new version, editing tags, etc.), download one or more selected source documents from the SRA service to the user's computer system, and/or delete one or more selected source documents. Report management controls 806 are user interface controls that allow a user to view a list of previously generated reports, view the contents one or more selected reports, and/or delete one or more selected reports.

5. Miscellaneous

In an embodiment, a system includes one or more devices, including one or more hardware processors, that are configured to perform any of the operations described herein and/or recited in any of the claims.

In an embodiment, one or more non-transitory computer-readable storage media store(s) instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

6. Computing Devices

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 9:
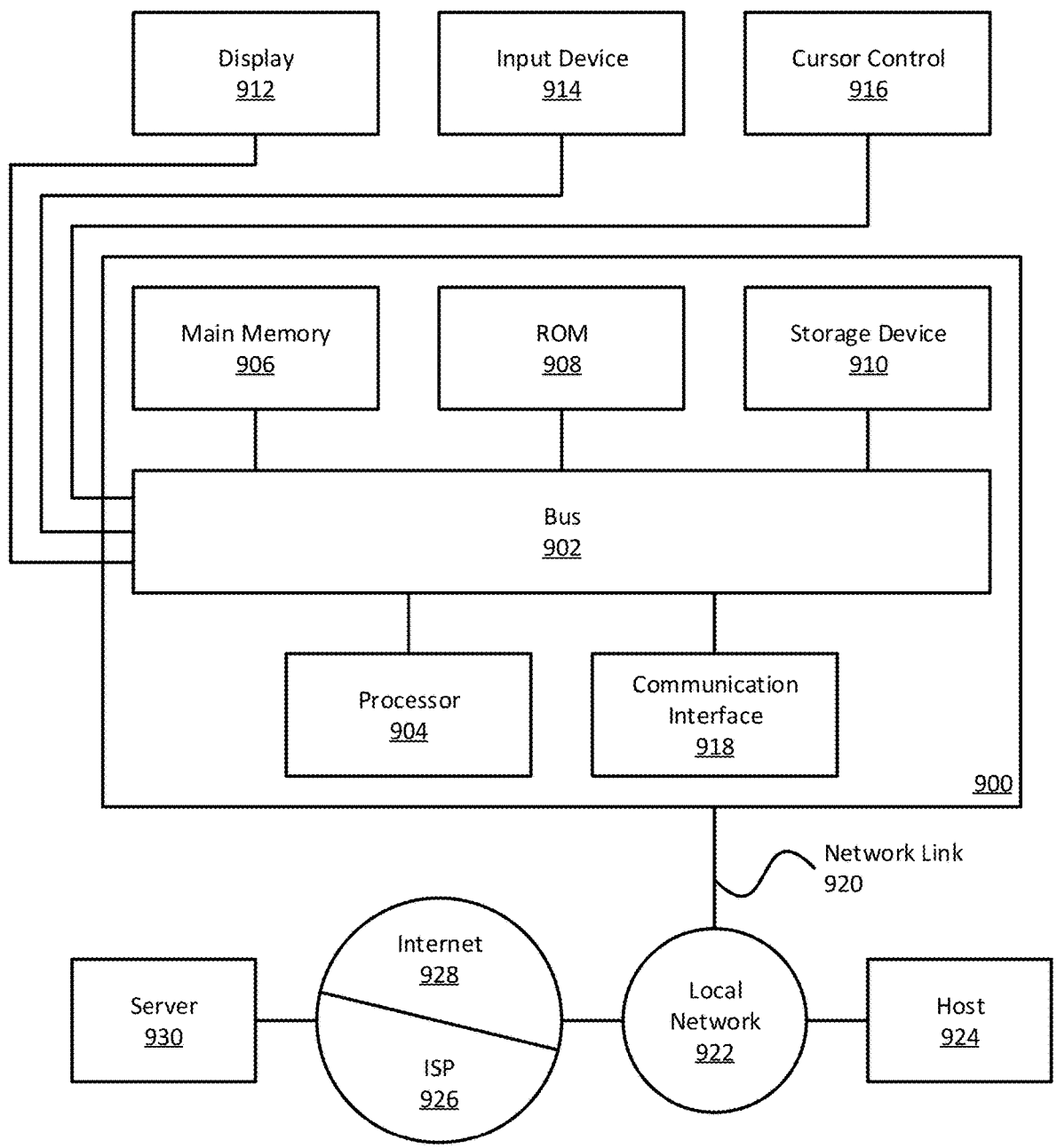
FIG. 9 is a block diagram of an example of a computer system according to an embodiment.

For example, FIG. 9 is a block diagram of an example of a computer system 900 according to an embodiment. Computer system 900 includes a bus 902 or other communication mechanism for communicating information, and a hardware processor 904 coupled with the bus 902 for processing information. Hardware processor 904 may be a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in one or more non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or additionally, computer system 900 may receive user input via a cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Alternatively or additionally, computer system 9 may include a touchscreen. Display 912 may be configured to receive user input via one or more pressure-sensitive sensors, multi-touch sensors, and/or gesture sensors. Alternatively or additionally, computer system 900 may receive user input via a microphone, video camera, and/or some other kind of user input device (not shown).

Computer system 900 may implement the techniques described herein using customized hard-wired logic, one or more ASICs or FPGAs, firmware, and/or program logic which in combination with other components of computer system 900 causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 902. Transmission media may also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 900 may receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922, and communication interface 918.

The received code may be executed by processor 904 as it is received, and/or stored in storage device 910, or other non-volatile storage for later execution.

7. Computer Networks

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread) A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. A method comprising:
generating a system model comprising a plurality of system requirements, at least by performing natural-language processing on a natural-language representation of the plurality of system requirements;
performing, based at least on the system model, a first analysis of the plurality of system requirements against a plurality of codified system requirements rules;
determining, based at least on the first analysis of the plurality of system requirements against the plurality of codified system requirements rules, that the plurality of system requirements comprises a violation of a system requirements rule in the plurality of system requirements rules;
generating a report that identifies at least
(a) the violation of the system requirements rule and
(b) a suggested action to remediate the violation of the system requirements rule;
generating a revised system model, the revised system model comprising a revised plurality of system requirements that incorporates the suggested action to remediate the violation of the system requirements rule;
performing, based at least on the revised system model, a second analysis of the revised plurality of system requirements against the plurality of codified system requirements rules; and
determining, based at least on the second analysis of the revised plurality of system requirements against the plurality of codified system requirements rules, that the revised plurality of system requirements does not violate the system requirements rule;
generating a provenance trail between the plurality of system requirements and the revised plurality of system requirements; and
presenting the provenance trail in a graphical user interface.

2. The method of claim 1, wherein generating the system model comprises:
generating a plurality of semantic triples representing the plurality of system requirements.

3. The method of claim 2, wherein generating the plurality of semantic triples is based at least on a model of propositions representing the plurality of system requirements.

4. The method of claim 3, wherein generating the system model further comprises:
generating the model of propositions, at least by parsing text comprising the natural-language representation of the plurality of system requirements.

5. The method of claim 4, wherein generating the system model further comprises:
extracting the text from a source document comprising at least a portion that is not plaintext.

6. The method of claim 1, wherein the first analysis of the plurality of system requirements against the plurality of codified system requirements rules is further based on a general domain knowledge model representing at least one item of general knowledge that is not explicitly represented by the system model.

7. The method of claim 6, wherein generating the system model comprises:
incorporating information from the general domain knowledge model with output of the natural-language processing.

8. The method of claim 1, wherein performing the first analysis of the plurality of system requirements comprising applying one or more queries in a semantic query language to the system model.

9. The method of claim 8, further comprising:
generating at least a subset of the one or more queries, based at least on the natural-language processing on the natural-language representation of the plurality of system requirements.

10. The method of claim 9:
wherein the system model comprises a set of confidentiality, integrity, and authentication (CIA) constraints;
wherein the set of CIA constraints comprising at least one confidentiality constraint, at least one integrity constraint, and at least one authentication constraint; and
wherein the one or more queries represent one or more system constraints not included in the set of CIA constraints.

11. The method of claim 1, further comprising:
presenting a graphical user interface configured to receive the natural-language representation of the plurality of system requirements; and
receiving, via the graphical user interface, a document comprising the natural-language representation of the plurality of system requirements.

12. The method of claim 1, wherein the violation of the system requirements rule corresponds to one or more of: an under-specified system requirement; a missing system requirement; an ambiguous system requirement; an unquantifiable system requirement; conflicting system requirements; and/or redundant system requirements.

13. The method of claim 1, wherein the report further identifies a specific portion of the natural-language representation of the plurality of system requirements as a provenance of the violation of the system requirements rule.

14. The method of claim 1, wherein the report comprises at least an intermediate level analysis section and a detailed analysis section.

15. The method of claim 14, wherein the intermediate level analysis section comprises, for the violation of the system requirements rule, a user-selectable link to a corresponding portion of the detailed analysis system.

16. A system comprising:
one or more processors; and
one or more non-transitory computer-readable media storing instructions that, when executed by the one or more processors, cause: generating a system model comprising a plurality of system requirements, at least by performing natural-language processing on a natural-language representation of the plurality of system requirements;
performing, based at least on the system model, a first analysis of the plurality of system requirements against a plurality of codified system requirements rules;
determining, based at least on the first analysis of the plurality of system requirements against the plurality of codified system requirements rules, that the plurality of system requirements comprises a violation of a system requirements rule in the plurality of system requirements rules;
generating a report that identifies at least
(a) the violation of the system requirements rule and (b) a suggested action to remediate the violation of the system requirements rule;

generating a revised system model, the revised system model comprising a revised plurality of system requirements that incorporates the suggested action to remediate the violation of the system requirements rule;

performing, based at least on the revised system model, a second analysis of the revised plurality of system requirements against the plurality of codified system requirements rules; and determining, based at least on the second analysis of the revised plurality of system requirements against the plurality of codified system requirements rules, that the revised plurality of system requirements does not violate the system requirements rule;

generating a provenance trail between the plurality of system requirements and the revised plurality of system requirements; and presenting the provenance trail in a graphical user interface.

17. The system of claim 16, further comprising:

a data repository configured to store semantic triples representing the plurality of system requirements.

18. One or more non-transitory computer-readable media storing instructions that, when executed by one or more processors, cause:

generating a system model comprising a plurality of system requirements, at least by performing natural-language processing on a natural-language representation of the plurality of system requirements;

performing, based at least on the system model, a first analysis of the plurality of system requirements against a plurality of codified system requirements rules;

determining, based at least on the first analysis of the plurality of system requirements against the plurality of codified system requirements rules, that the plurality of system requirements comprises a violation of a system requirements rule in the plurality of system requirements rules;

generating a report that identifies at least
(a) the violation of the system requirements rule and
(b) a suggested action to remediate the violation of the system requirements rule;

generating a revised system model, the revised system model comprising a revised plurality of system requirements that incorporates the suggested action to remediate the violation of the system requirements rule;

performing, based at least on the revised system model, a second analysis of the revised plurality of system requirements against the plurality of codified system requirements rules; and determining, based at least on the second analysis of the revised plurality of system requirements against the plurality of codified system requirements rules, that the revised plurality of system requirements does not violate the system requirements rule;

generating a provenance trail between the plurality of system requirements and the revised plurality of system requirements; and presenting the provenance trail in a graphical user interface.

\* \* \* \* \*